United States Patent
Nielsen et al.

(10) Patent No.: US 10,236,686 B2
(45) Date of Patent: Mar. 19, 2019

(54) REACTIVE POWER SUPPORT FROM WIND TURBINE FACILITIES

(71) Applicant: VESTAS WIND SYSTEMS A/S, Aarhus N (DK)

(72) Inventors: John Godsk Nielsen, Hornslet (DK); Søren Andersen, Tilst (DK); Duy Duc Doan, Tilst (DK); Lars Helle, Suldrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/517,881

(22) PCT Filed: Sep. 22, 2015

(86) PCT No.: PCT/DK2015/050287
§ 371 (c)(1),
(2) Date: Apr. 7, 2017

(87) PCT Pub. No.: WO2016/055069
PCT Pub. Date: Apr. 14, 2016

(65) Prior Publication Data
US 2017/0244251 A1    Aug. 24, 2017

(30) Foreign Application Priority Data
Oct. 7, 2014 (DK) ................... 2014 70622

(51) Int. Cl.
*H02J 3/18* (2006.01)
*H02J 3/16* (2006.01)
*H02J 3/38* (2006.01)
*H02J 3/28* (2006.01)
*F03D 7/02* (2006.01)
*H02H 7/06* (2006.01)
*H02P 9/04* (2006.01)

(52) U.S. Cl.
CPC .......... *H02J 3/1885* (2013.01); *F03D 7/0272* (2013.01); *F03D 7/0284* (2013.01);
(Continued)

(58) Field of Classification Search
CPC .... H02J 3/1885; H02J 3/16; H02J 3/28; H02J 3/386; F03D 7/0272; F03D 7/0284; H02H 7/067; H02P 9/04; F05B 2270/1033
(Continued)

(56) References Cited

U.S. PATENT DOCUMENTS

2005/0040655 A1* 2/2005 Wilkins ................... F03D 7/02
290/44
2007/0159737 A1   7/2007 Wobben
(Continued)

FOREIGN PATENT DOCUMENTS

EP   2017936 A1   1/2009
EP   2605356 A1   6/2013
(Continued)

OTHER PUBLICATIONS

Danish Search Report for PA 2014 70622, dated May 5, 2015.
International Search Report for PCT/DK2015/050287, dated Dec. 8, 2015.

*Primary Examiner* — Tulsidas C Patel
*Assistant Examiner* — Charles Reid, Jr.
(74) *Attorney, Agent, or Firm* — Patterson + Sheridan, LLP (57) ABSTRACT

Techniques are described for operating a wind power facility in order to provide reactive power support to a power grid. The wind power facility may be a wind turbine or a wind power plant. An exemplary method includes increasing an amount of reactive power injected into the power grid, decreasing an amount of active power injected into the power grid by a certain amount, and dissipating and/or storing substantially the certain amount of active power.

20 Claims, 5 Drawing Sheets

(52) U.S. Cl.
CPC ............... *H02H 7/067* (2013.01); *H02J 3/16* (2013.01); *H02J 3/18* (2013.01); *H02J 3/28* (2013.01); *H02J 3/386* (2013.01); *H02P 9/04* (2013.01); *F05B 2270/1033* (2013.01); *Y02E 10/723* (2013.01); *Y02E 10/763* (2013.01); *Y02E 40/34* (2013.01)

(58) Field of Classification Search
USPC ...................................................... 290/44, 55
See application file for complete search history.

(56) References Cited

U.S. PATENT DOCUMENTS

| | | | |
|---|---|---|---|
| 2009/0206606 A1* | 8/2009 | Jorgensen | ............. F03D 7/0224 290/44 |
| 2011/0198846 A1* | 8/2011 | Wakasa | ................. F03D 7/0272 290/44 |
| 2012/0262960 A1* | 10/2012 | Giraut Ruso | ............. H02J 3/16 363/71 |
| 2013/0001955 A1* | 1/2013 | Wakasa | ................. F03D 7/0272 290/55 |
| 2013/0300118 A1* | 11/2013 | Bech | ....................... H02J 3/381 290/44 |
| 2014/0142771 A1 | 5/2014 | Nielsen et al. | |

FOREIGN PATENT DOCUMENTS

| | | |
|---|---|---|
| EP | 2693589 A1 | 2/2014 |
| WO | 2004059814 A2 | 7/2004 |
| WO | 2011/019321 A2 | 2/2011 |
| WO | 2012000517 A2 | 1/2012 |
| WO | 2012022353 A2 | 2/2012 |
| WO | 2013/097862 A2 | 7/2013 |

\* cited by examiner

REACTIVE POWER SUPPORT FROM WIND TURBINE FACILITIES

FIELD OF THE INVENTION

The present invention relates to a method for providing a fast reactive power support to a power grid. In particular, the present invention relates to a method for providing fast reactive power support from a wind power facility already being operated at or near its rated power level.

BACKGROUND OF THE INVENTION

It is a well-established technique to provide reactive power support to a power grid from a wind turbine. Reactive power support is typically provided in case the grid voltage for some reasons decreases.

However, according to traditional methods fast reactive power support may be difficult, if not impossible, to provide if the wind turbine selected for this purpose is already being operated at or near its rated power level. The reason for this mainly being that the overall current limit of the selected wind turbine may be exceeded if the reactive power support is launched while the wind turbine is already being operated at or near its rated power level. Obviously, exceeding the current limit of the wind turbine might damage the wind turbine.

Traditional methods solve the current limit problem by slowly derating the selected wind turbine. However, this typically leads to unwanted grid instability as well as an increased rotor speed which has to be dealt with by pitching the rotor blades out of the wind in order to match the wind power input with the derated power level.

It may be seen as an object of embodiments of the present invention to provide a method for providing a fast reactive power support even though the wind turbine is operated at its rated power level.

DESCRIPTION OF THE INVENTION

The above-mentioned object is complied with by providing, in a first aspect, a method for operating a wind power facility in order to provide reactive power support to a power grid, the method comprising the step of increasing an amount of reactive power injected into the power grid,
decreasing an amount of active power injected into the power grid by a certain amount, and
dissipating and/or storing essentially said certain amount of active power in power dissipation and/or power storage means.

In the present context the term wind power facility should be understood broadly. Thus, the term wind power facility may cover a single wind turbine or a wind power plant comprising a plurality of wind turbines.

It is an advantage of the method of the present invention that reactive power may be provided fast and swift so that for example grid instabilities may be avoided. Grid instabilities may occur if the grid voltage falls below a predefined value, such as below a predefined voltage deadband around the nominal voltage level.

The sum of the amount of active power injected into the power grid and the amount of active power dissipated and/or stored may be essentially constant over a given time period. Thus, the power generated by a wind turbine generator is remained essentially constant of a given period of time before rotor blade pitching, power reduction etc. is initiated. This time period may be in the range of 0-2 seconds.

In general, the method of the present invention ensures that current limits of the wind power facility are not exceeded even though the amount of reactive power to the power grid is increased while the wind power facility is being operated at or near its rated power level. This is ensured by decreasing the amount of active power provided to the power grid. The step of increasing the reactive power and decreasing the active power is preferably performed essentially simultaneously.

The power dissipation means may comprise a DC chopper comprising a number of dump load resistors, whereas the power storage means may comprise a number of batteries and/or capacitors. Combined power dissipation and power storage means may also be applicable in relation to the present invention.

The method according to the present invention may further comprise the step of pitching wind turbine rotor blades out of the wind over time so as to reduce the wind power input. The rotor blade pitching may be initiated after an optional delay period of 0-2 seconds. After the optional delay period the rotor blade pitching may be carried out during a period of 5-10 seconds. Similarly, the dissipated and/or stored amount of active power may be decreased accordingly over time in order to match the decreased wind power input. Thus, the dissipated and/or stored amount of active power may be decreased over a period of 5-10 seconds after an optional delay period of 0-2 seconds.

In a second aspect the present invention relates to a wind turbine facility for providing reactive power support to a power grid, the wind turbine facility comprising reactive power control means for increasing an amount of reactive power injected into the power grid, and
active power control means for decreasing an amount of active power injected into the power grid by a certain amount, and for dissipating and/or storing essentially said certain amount of active power in power dissipation and/or power storage means.

Thus, the second aspect of the present invention relates to means for carrying out the method according to the first aspect. Again, the wind power facility may comprise a wind turbine or a wind power plant.

As mentioned in the relation to the first aspect of the present invention the power dissipation means may comprise a DC chopper comprising a number of dump load resistors. Moreover, the power storage means may comprise a number of batteries and/or capacitors from where reactive power may be provided if required.

The operation of the wind turbine facility in case a fast reactive power support is required follows the route outlined in relation to the first aspect of the present invention.

BRIEF DESCRIPTION OF THE DRAWINGS

The present invention will now be explained in further details with reference to the accompanying figures, where.

While the invention is susceptible to various modifications and alternative forms specific embodiments have been shown by way of examples in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its most general aspect the present invention relates to a method and a wind turbine facility that facilitates a fast and swift reactive power support to a power grid even though the power source to deliver the reactive power is already being operated at or near its rated power level. The power source is typically a wind turbine facility, such as a single wind turbine or a wind power plant, or a part thereof, comprising a plurality of wind turbines.

The fast and swift behaviour of the method of the present invention is provided by promptly reducing the amount of active power injected into the power grid, and dissipated and/or storing this amount of active power in some sort of dump load and/or power reservoir to that the load on the wind turbine generator remains essentially unaffected. The essentially unaffected load on the wind turbine generator prevents that the rotor speed increases. As it will be explained later the dissipation and/or storing of power may be performed on a relative short term scale, i.e. from a few seconds to a few minutes.

Figure 1:
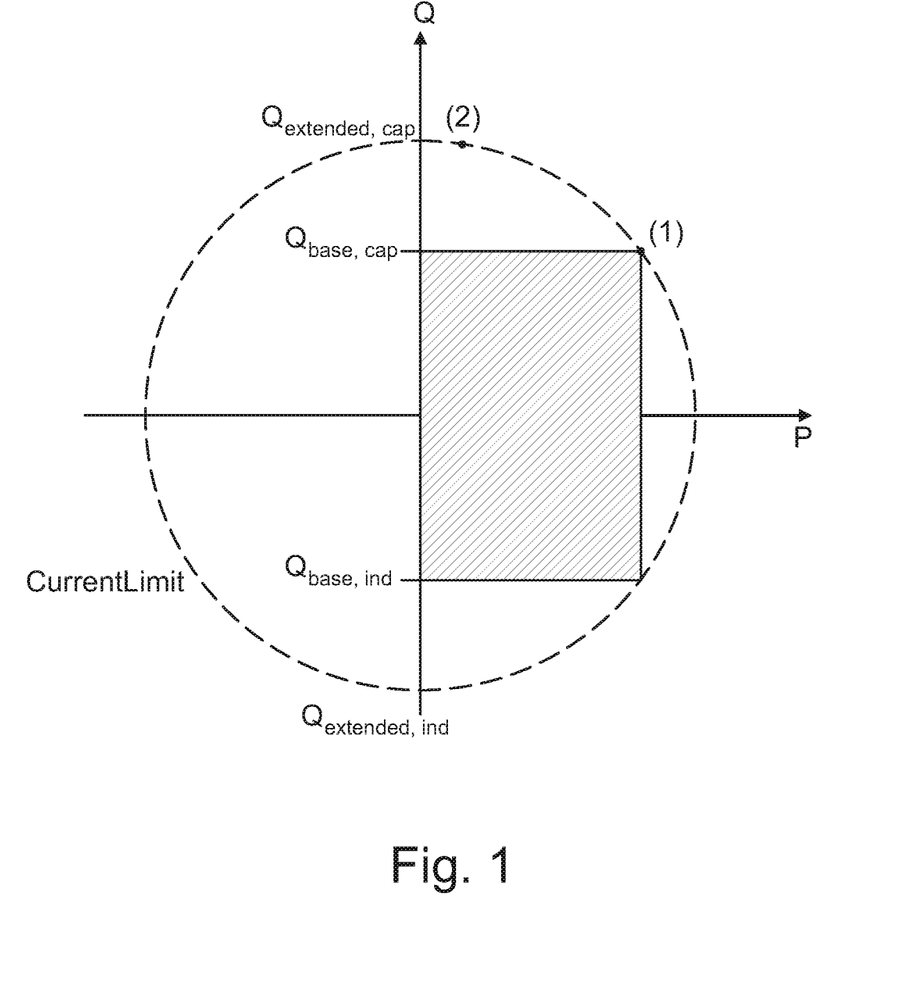
FIG. 1 shows a typical PC chart.

Referring now to FIG. 1 at typical PQ chart of a wind turbine generator is shown. The underlying idea of the present invention is to extend the PQ chart in order to provide a large and fast reactive power capability of the wind turbine.

In case the wind turbine is operating at its rated active power level the reactive power control range is typically a base region corresponding to the hatched region ranging from $Q_{base,ind}$ to $Q_{base,cap}$. The indexes "ind" and "cap" here refer to induction and capacitive, respectively. In order to increase reactive power capability beyond this hatched region the wind turbine has to reduce its active power production. Otherwise the current limit (dashed circle) of the wind turbine is violated.

In order to be able to provide a fast and swift reactive power response it is the aim of the present invention to maintain the same reactive power ramp rate in the whole extended range, i.e. inside and outside the hatched region. The reactive power ramp rate may vary within the range 1-50 per unit per second, which gives a certain MVar/s depended on the wind turbine size. As an example the reactive power ramp rate may be 20 per unit per second. For a 3 MW wind turbine this means that the reactive power ramp rate is 60 MVar/s, whereas in the case of a 1 MW wind turbine the reactive power ramp rate is 20 MVar/s.

The fast reactive power increase is provided by swiftly changing the working point of the wind turbine from working point (1) to working point (2). The active power provided to the power grid should be decreased with essentially the same speed. For wind turbines with DC choppers the otherwise unavoidable rotor speed increase can be counteracted by dissipating and/or storing active power into for example dump load resistors.

By implementing the above-mentioned type of control the need for expensive standby StatComs is avoided, because the full extended capability ($Q_{extended,ind}$ to $Q_{extended,cap}$) of the wind turbine can be utilized with high reactive power ramp rates.

Figure 2:
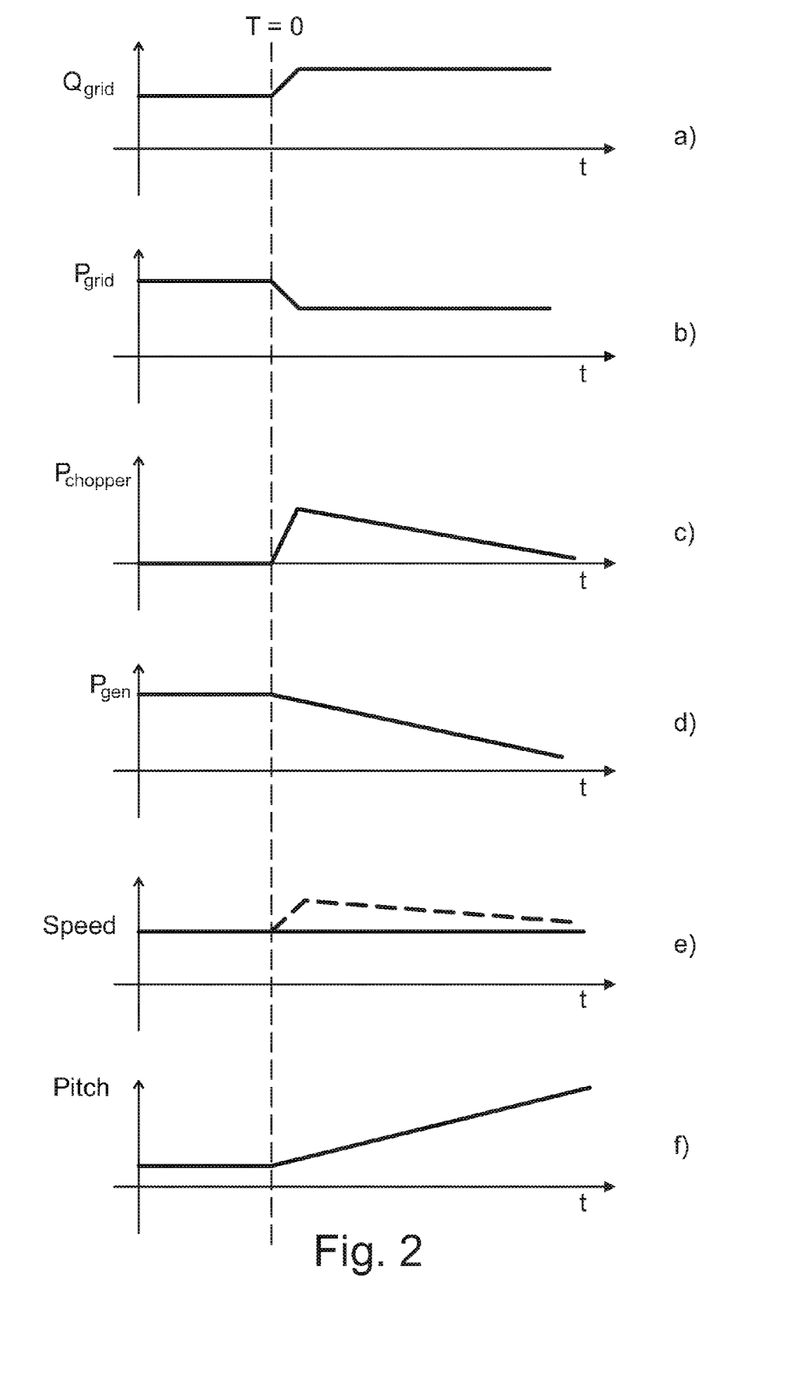
FIG. 2 illustrates how various parameters are changed.

Referring now to FIG. 2 schematic illustrations of selected parameters are depicted. The reactive power increase is initiated at T=0. The parameters shown in FIG. 2 are as follows:

a) Reactive power injected into power grid vs. time
b) Active power injected into power grid vs. time
c) Active power dissipated in DC chopper vs. time
d) Active power at wind turbine generator terminals vs. time
e) Rotor speed vs. time
f) Rotor pitch vs. time As shown in a) the increase of reactive power into the power grid is initiated at T=0. The reason for this may be many, such as a falling grid voltage. To avoid exceeding the current limit of the wind turbine the active power provided to the power grid is reduced at essentially the same time, see b), and with essentially the same rate. When the increased amount of reactive power is no longer required (not shown) the reactive and active power levels return to their respective levels prior to T=0.

The amount of active power not being injected into the power grid is dissipated in a DC chopper c) so that the load on the generator d) as well as the rotor speed e) remain essentially unchanged on the short term. The e) the essential constant rotor speed is shown as the solid line. For comparison e) also shows (dashed line) how the rotor speed will increase if the DC chopper is inactive or not present.

As depicted in f) the rotor blades are pitched out of the wind on the longer time scale. The pitching can be initiated immediately or after a time delay of typically 0-2 seconds. This also affects the generated power d) as well as the amount of power dissipated in the DC chopper c). As illustrated in d) the generator power decreases as the rotor blades are pitched out of the wind. Typically, the pitching process takes 5-10 seconds. As a consequence of the decreasing generator power the power dissipated in the DC chopper also decreases over the same time period.

The decrease in power dissipation and/or storage c), generated power d) and the rotor blade pitch f) are all depicted as linear changes over time. However, non-linear dependencies may also be applicable as well. This also applies to the reactive power a) and active power b) changes which may be of a non-linear nature as well.

Thus, when a demand for reactive power support is detected, the amount of reactive power to the power grid is increased while the amount of active power is decreased. A DC chopper (or power storage means) is activated to maintain the load on the generator. On a longer time scale the rotor blades are pitched out of the wind so that the generator power, and thereby also the dissipated/stored amount of power, is decreased.

The demand for increasing the amount of reactive power may be triggered by for example a falling grid voltage. Thus, if the grid voltage falls below a certain limit, for example below a predefined deadband, the power distributor may require that additional reactive power is injected into the grid in order to increase or at least stabilize the grid voltage. In this context the power distributor may also require that a certain amount of reactive power reserve is available for support purposes.

Figure 3:
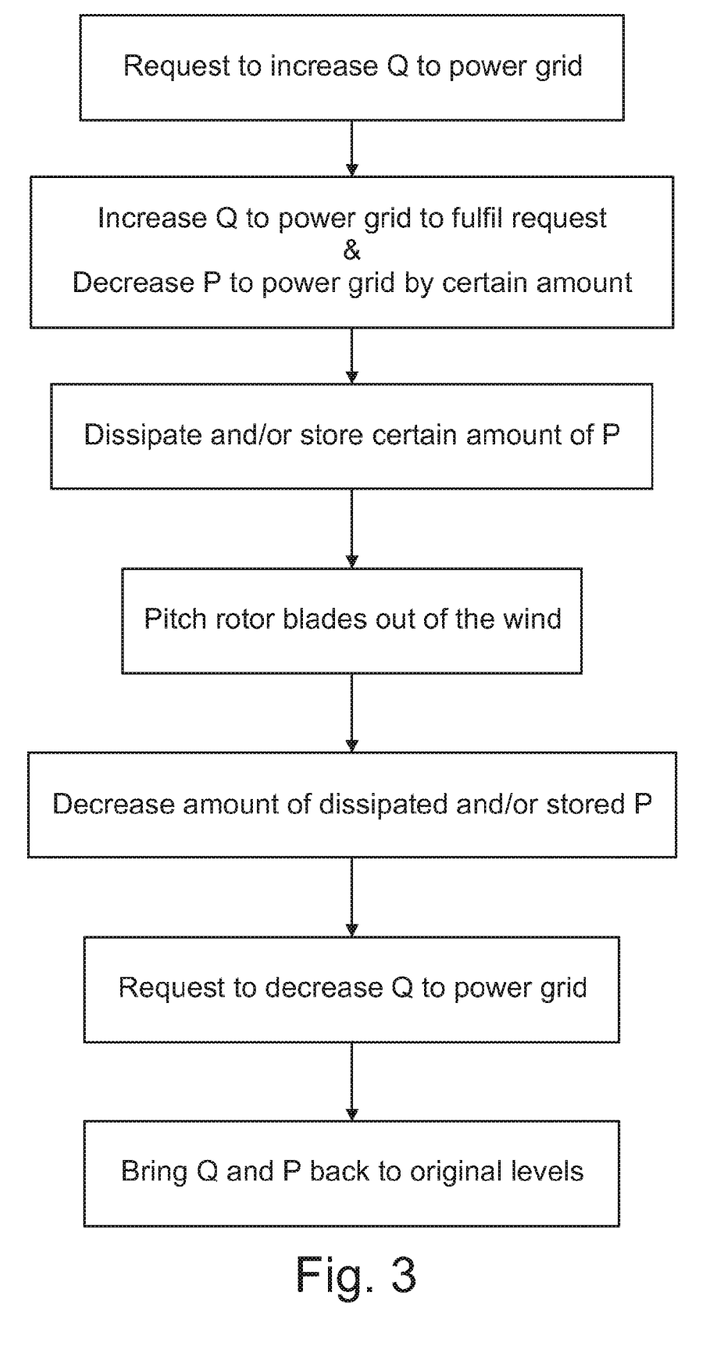
FIG. 3 shows a flow chart illustrating aspects of the method of the present invention.

FIG. 3 shows a simplified flow-chart illustrating aspects of the method according to the present invention. A request for an increased amount of reactive power is received. In order to comply with this request, and at the same time, not exceeding any current limits of the wind power facility the reactive power to the power grid is increased, and the active power to the same power grid is decreased with a certain amount. The amount of active power no longer being provided to the power grid is instead being dissipated and/or stored in appropriate power dissipation/power storage means. After an optional delay period between 0 and 2 seconds pitching of the rotor blades out of the wind is initiated and the amount of dissipated and/or stored active power is decreased accordingly. At a later time the working conditions are normalised and a request for a decreased amount of reactive power is provided. In response to this request the reactive power and the active power may be brought back to their original power levels.

Figure 4:
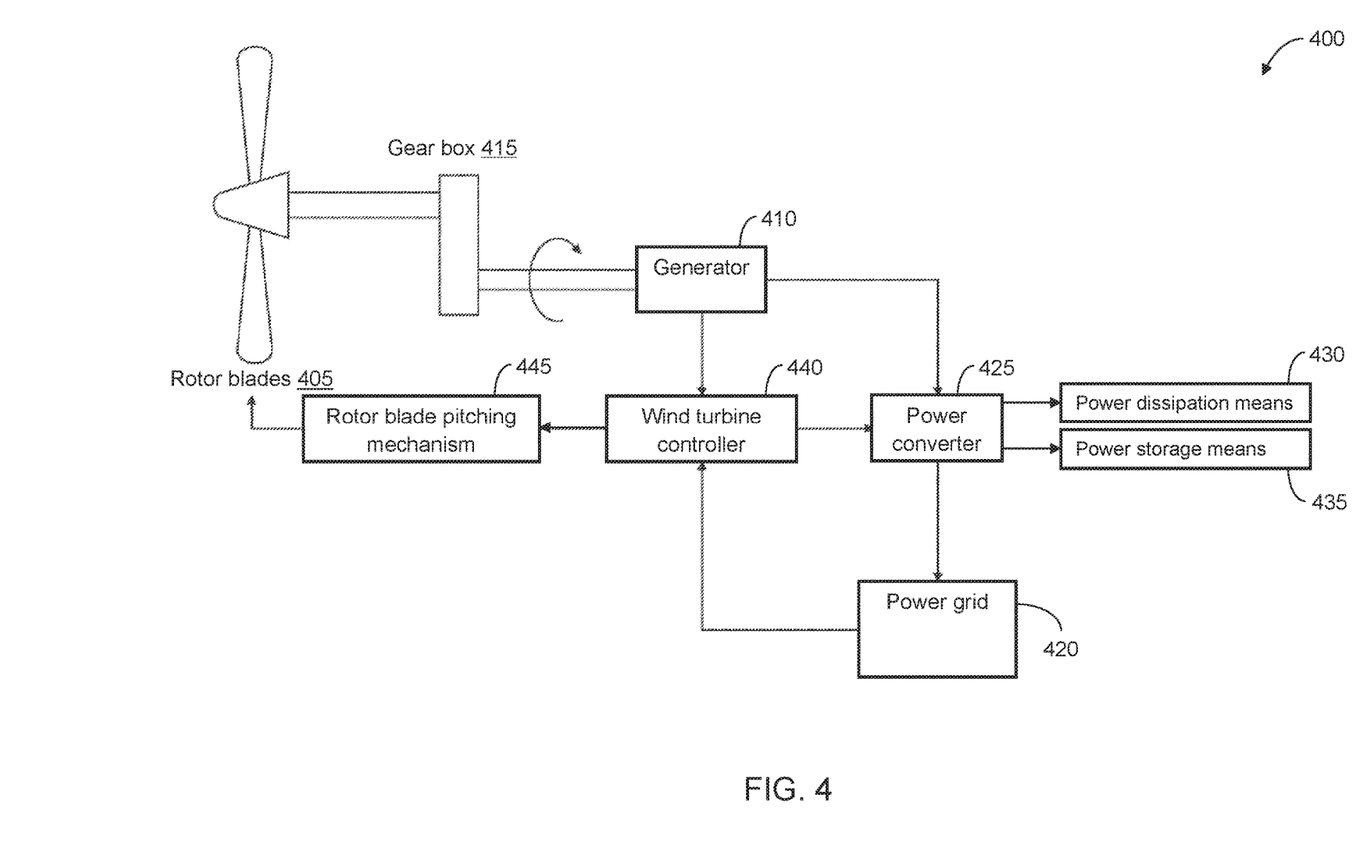
FIG. 4 shows a wind turbine facility being capable of carrying out the invention.
Figure 5:
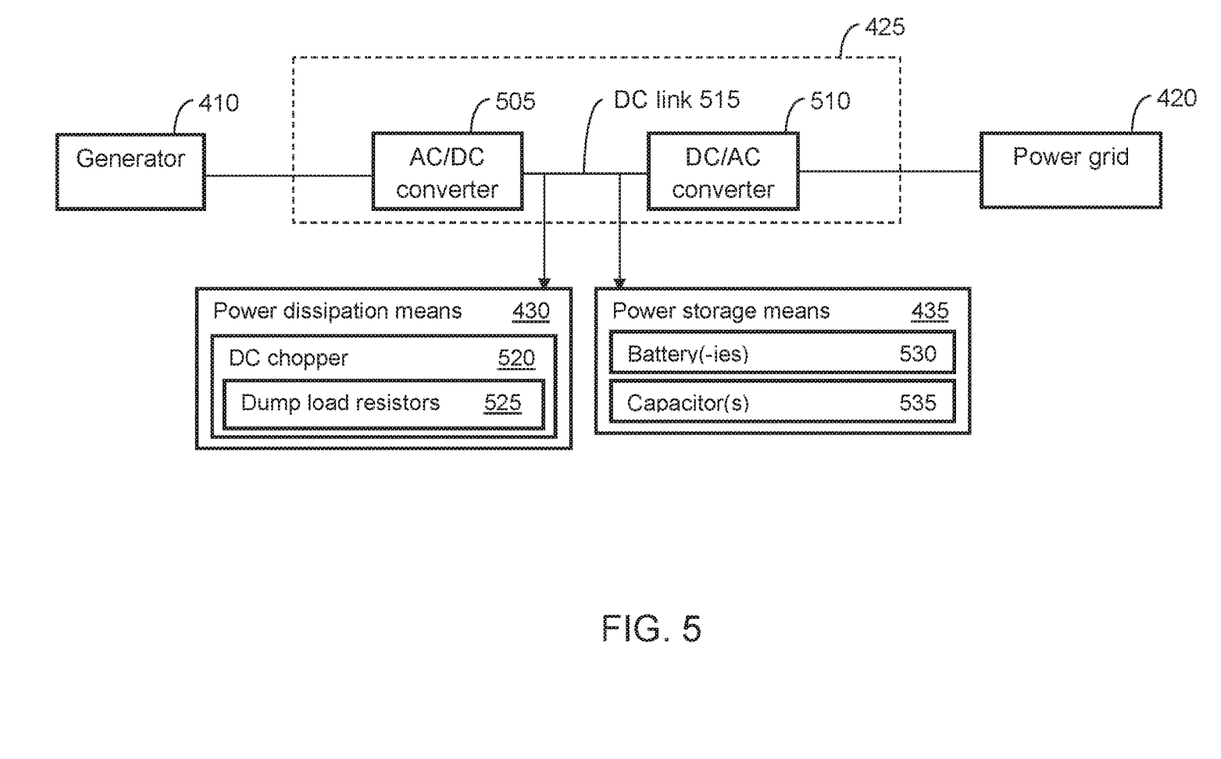
FIG. 5 is a block diagram of the wind turbine facility of FIG. 4.

FIGS. 4 and 5 depict a wind turbine facility 400 comprising a set of rotatably mounted rotor blades 405 being mechanically coupled to a generator 410 via a gear box 415. The generated power is provided to an associated power grid 420 via a power converter 425. The power converter 425 typically comprises a generator side AC/DC converter 505 and a grid side DC/AC converter 510. The AC/DC converter 505 converts the three phase AC power from the generator 410 into DC power. Similarly, the DC/AC converter 510 converts the DC power into AC power having a frequency that matches the nominal frequency of the power grid 420. The AC/DC converter 505 and the DC/AC converter 510 are separated by an intermediate DC link 515 to which the power dissipation means 430 and/or power storage means 435 are coupled. The power dissipation means 430 typically comprises a DC-chopper 520 and a number of resistive dump loads (dump load resistors 525). For the power storage means 435, batteries 530 and/or capacitors 535 may be applicable. A wind turbine controller 440 controls at least the power converter 425 and the rotor blade pitching mechanism 445 in response to control or sensor signals from at least the power grid 420 and the generator 410.

What is claimed is:

1. A method for operating a wind power facility to provide reactive power support to a power grid, the method comprising:
   increasing, using one or more power converters of the wind power facility, an amount of reactive power injected by the wind power facility into the power grid; and
   decreasing, based on the increased amount of reactive power, an amount of active power injected by the one or more power converters into the power grid by a certain amount to thereby maintain the wind power facility within a predefined operational limit, wherein decreasing the amount of active power injected into the power grid comprises:
      diverting substantially the certain amount of active power to one or both of power dissipation means and power storage means of the wind power facility.

2. The method according to claim 1, wherein a sum of the amount of active power injected into the power grid and the certain amount of active power is substantially constant over a given time period.

3. The method according to claim 1, wherein the wind power facility comprises a wind turbine or a wind power plant.

4. The method according to claim 1, wherein increasing the amount of reactive power and decreasing the active power is performed substantially simultaneously.

5. The method according to claim 1, wherein the power dissipation means comprises a direct current (DC) chopper comprising a number of dump load resistors.

6. The method according to claim 1, wherein the power storage means comprises one or both of a battery and a capacitor.

7. A method according to claim 1, wherein decreasing the amount of active power injected into the power grid further comprises:
   during a delay period having a length between zero and two seconds, maintaining an active power generation of the wind power facility; and
   pitching wind turbine rotor blades out of the wind after the delay period.

8. The method according to claim 7, wherein an amount of diverted active power is decreased after the delay period.

9. The method of claim 8, wherein decreasing the amount of diverted active power matches a reduction of injected active power caused by pitching the wind turbine rotor blades.

10. The method of claim 1, wherein the predefined operational limit comprises a current limit of the one or more power converters.

11. The method of claim 10, further comprising:
    determining that, for a level of active power being injected into the power grid by the wind power facility, fulfilling the reactive power demand would exceed the current limit.

12. The method of claim 11, wherein the level of active power being injected into the power grid comprises a rated power level of the wind turbine facility.

13. The method of claim 1, further comprising:
    maintaining a level of active power generation of the wind power facility while decreasing the amount of active power injected into the power grid.

14. The method of claim 1, wherein a rate of increasing the amount of reactive power has the same magnitude as a rate of decreasing the amount of active power.

15. The method of claim 1, wherein the increased amount of reactive power is at least partly provided using the power storage means.

16. A wind turbine facility for providing reactive power support to a power grid, the wind turbine facility comprising:
    at least one generator;
    at least one power converter configured to convert power generated by the at least one generator;
    one or both of power dissipation means and power storage means; and
    at least one controller communicatively coupled with the at least one power converter and the one or both of power dissipation means and power storage means, the at least one controller configured to:
       increase, using the at least one power converter, an amount of reactive power injected by the wind power facility into the power grid; and
       decrease, based on the increased amount of reactive power, an amount of active power injected by the at least one power converter into the power grid by a certain amount to thereby maintain the wind turbine facility within a predefined operation limit, wherein decreasing the amount of active power injected into the power grid comprises:
          diverting substantially the certain amount of active power to one or both of the power dissipation means and the power storage means.

17. The wind turbine facility according to claim 16, wherein the wind turbine facility comprises a wind turbine or a wind power plant.

18. The wind turbine facility according to claim 16, wherein the power dissipation means comprises a direct current (DC) chopper comprising a number of dump load resistors.

19. The wind turbine facility according to claim 16, wherein the power storage means comprises one or both of a battery and a capacitor.

20. A controller for a wind power facility, the controller comprising:
  one or more computer processors configured to:
    increase, using one or more power converters of the wind power facility, an amount of reactive power injected by the wind power facility into the power grid; and
    decrease, based on the increased amount of reactive power, an amount of active power injected by the one or more power converters into the power grid by a certain amount to thereby maintain the wind power facility within a predefined operational limit, wherein decreasing the amount of active power injected into the power grid comprises:
      diverting substantially the certain amount of active power to one or both of power dissipation means and power storage means of the wind power facility.

* * * * *